April 22, 1958

F. J. WARNER ET AL 2,831,758

GASEOUS FUEL CARBURETING SYSTEM

Filed Aug. 5, 1954

INVENTORS
FRED J. WARNER
W. H. EASTON
B. S. DAVENPORT

BY

ATTORNEY C. M. McKnight

April 22, 1958    F. J. WARNER ET AL    2,831,758
GASEOUS FUEL CARBURETING SYSTEM
Filed Aug. 5, 1954    3 Sheets-Sheet 2

INVENTORS
FRED J. WARNER
BY W. H. EASTON
B. S. DAVENPORT
ATTORNEY

April 22, 1958   F. J. WARNER ET AL   2,831,758
GASEOUS FUEL CARBURETING SYSTEM
Filed Aug. 5, 1954   3 Sheets-Sheet 3

INVENTORS
FRED J. WARNER
BY W. H. EASTON
B. S. DAVENPORT
ATTORNEY

United States Patent Office 2,831,758
Patented Apr. 22, 1958

2,831,758
GASEOUS FUEL CARBURETING SYSTEM

Fred J. Warner, Oklahoma City, and William H. Easton and Bert S. Davenport, Stillwater, Okla.

Application August 5, 1954, Serial No. 448,068

4 Claims. (Cl. 48—184)

This invention relates to new and useful improvements in fuel feeding systems of internal combustion engines, and more particularly, but not by way of limitation, to improvements in the carburetor system of internal combustion engines utilizing or capable of utilizing liquefied petroleum gases, such as propane, butane and the like as a fuel media.

During the last two decades the use of liquefied petroleum gases as a motor fuel for internal combustion engines has come into considerable prominence. Gaseous or vapor fuel feed systems for internal combustion engines ordinarily and usually include a high pressure regulator and low pressure regulator cooperatnig with a mixing valve or carburetor of the engine in order that the regulators may progressively reduce the fuel pressure normally stored under high pressure conditions to initially provide an intermediate pressure, and finally a low pressure approaching substantially atmospheric or sub-atmospheric pressure for discharge at a predetermined and regulated pressure into the carburetor, and hence to the combustion engine. The superiority and economy of liquefied petroleum gases apparently has not been fully exploited because of certain inherent differences and characteristics between the well known liquefied petroleum gases and gasoline fuel.

In the usual internal combustion engine utilizing a gasoline carburetion system, it is necessary to make certain modifications for conversion to the use of liquefied gases as an efficient motor fuel. One of the most vital features in the conversion aspect is the increase of the compression ratio from substantially 6–7.5 to 1 to about 8 or 10 to 1. Furthermore, the advance of the spark timing with respect to the engine speed is a feature effecting an efficient use of vaporized fuel. Normally the hot manifold of an internal combustion engine is detrimental to any economical use of vaporized fuel under certain conditions, however, in present day vapor fuel feeding systems the performing vaporization is not particularly essential because in most instances the fuel is vaporized before it is discharged into the engine manifold. The operation of the carburetor in vapor fuel systems is probably the most important in use with the above mentioned associated equipment, in order to produce and maintain the required air-fuel ratio for variable engine service conditions that will feed the proper mixture to all of the various engine cylinders with equal distribution.

The present invention is primarily concerned with a unit construction where the various elements of a vapor fuel feeding apparatus may be combined in one assembly for connection to the manifold intake of an internal combustion engine in lieu of the usual gas carburetor apparatus. Furthermore, the present invention contemplates the discharge of the proper air-fuel ratio into the carburetor so that the metering of the gaseous fuel will be controlled by a balance of forces providing an efficient volume and pressure for an efficient feeding of the fuel under all variable engine conditions.

It is an important object of this invention to provide an improved vapor fuel control feeding system which is particularly adaptable for use with internal combustion engines, and which will efficiently and accurately control the flow of the fuel to the engine under all operating conditions.

And still another object of this invention is to provide an improved gaseous fuel feeding system capable of utilization initially, or by conversion with an internal combustion engine for operating on the gaseous fuel in a manner to efficiently control the fuel supply at idling conditions as well as all other ranges of engine operation in order to maintain maximum engine efficiency.

And another object of this invention is to provide an improved fuel feeding system particularly adapted for the handling of gaseous fuel such as propane, butane and the like wherein the motor fuel may be positively shut off from any discharge to the engine manifold when the engine is not running.

And still another object of this inventio is to provide a improved carburetor apparatus particularly adaptable for utilization for vapor fuels such as liquefied petroleum gases in which the fuel control valve is balanced at all times of engine operation, and is unbalanced when the engine is not running.

And another important object of this invention is to provide an improved carburetor utilizing liquefied petroleum gases and having a balanced fuel control valve providing an efficient and controlled metering of fuel across the value for discharge by the carburetor to the engine.

And still another object of this invention is to provide a fuel feeding system utilizing liquefied petroleum gases capable of initial, or conversion adaptation to internal combustion engines which is of unit construction effecting a reduction in connector difficulties and accompanying frictional losses, as well as simplifying the installation and reduction of space requirements without any loss of efficient operation.

And still another object of this invention is to provide a unit construction gaseous fuel feeding system which is capable of multiple adaptations, and modification in internal combustion engines depending upon the space available, particularly for coversion from the engine carburetor apparatus by direct placement to the intake manifold of the engine normally occupied by a gasoline carburetor.

And still another object of this invention is to provide a gaseous fuel feeding system for internal combustion engines which will provide vapor fuel at the necessary pressure to start and idle the engine, and also stop flow of motor fuel to the engine when the engine is not running.

And still another object of this invention is to provide a vapor fuel feeding system for internal combustion engines in which all operating valves of the system are constructed to open against incoming fuel pressure, thereby providing a safety feature in case of valve spring breakage or diaphragm failure, so that the valves will immediately close and prevent flow of fuel into the system.

And still another object of this invention is to provide a vapor fuel feeding system for utilization with internal combustion engines wherein the fuel supplied to the engine is measured with respect to the impact air pressure to the carburetor device.

And still an additional important object of this invention is to provide a vapor fuel feeding system which will control the amount of gaseous fuel discharging to the engine manifold, and where the fuel pressure for all engine operating conditions above a fast idle speed is slightly less than the impact pressure, and for all engine conditions below a fast idle and for starting the engine, the fuel pressure and volume is sufficient to supply the necessary vapor fuel to the carburetor mixture. Additionally, for slow idle conditions, and for starting the engine the vapor fuel is supplied to the carburetor mixer at a pressure slightly greater than that of impact pressure, and the volume of the fuel is of a metered quantity.

And still another object of this invention is to provide a vapor fuel feeding system for internal combustion engines wherein all fuel mixing with the air stream under any operating condition of the engine is conducted into the air stream through one main fuel passage directly into the venturi portion of the carburetor without use of any additional passageways.

And still another object of this invention is to provide a vapor fuel feeding system for an internal combustion engine wherein fuel fed to the carburetor is controlled through a balance of forces where the main actuating force is partially balanced by a pilot balancing force cooperating with the main balancing force.

Other objects and advantages of the invention will be evident from the following detailed description, read in conjunction with the accompanying drawings, which illustrate our invention.

Figure 1:
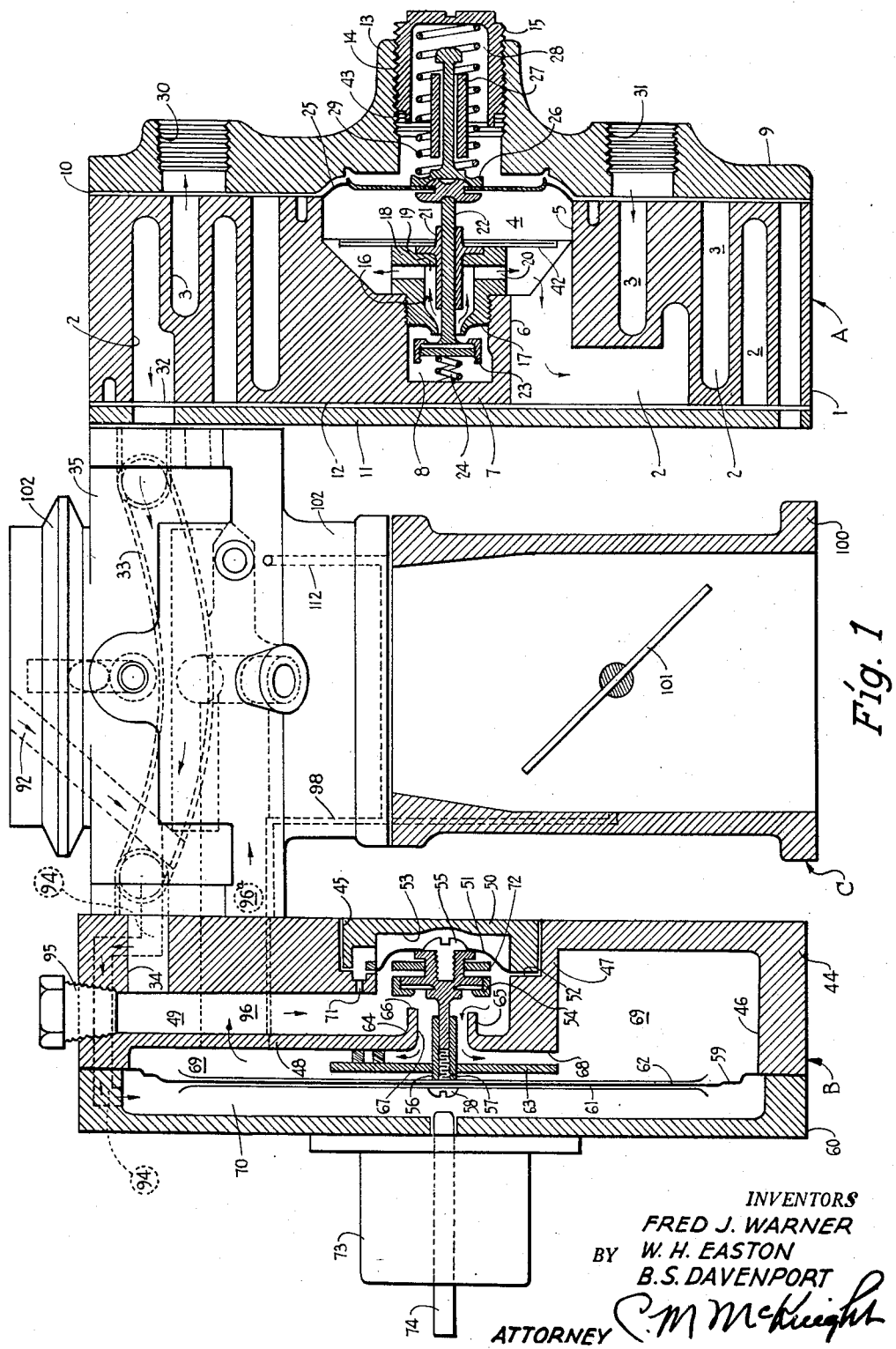
Figure 1 is a sectional elevational view of the improved unitary fuel feeding apparatus.

Referring to the drawings in detail, the fuel feeding apparatus comprises three essential elements wherein the high pressure regulator is designated by reference letter A, and the low pressure regulator is designated by letter B and the carburetor mixing unit by C. In the utilization of liquefied petroleum gases, such as propane, butane and the like, in an internal combustion engine, it is necessary that the liquefied gas from a storage point which may be the usual storage tank of the automotive vehicle (not shown) is discharged from the tank to the fuel feeding apparatus. However, prior to discharge into the internal combustion engine, it is necessary that the liquefied petroleum gases under normally high pressure must be progressively reduced in pressure in order to be efficiently used as a motor fuel. The high pressure regulator A cooperates with the low pressure regulator B in order to provide the progressive reduction of the fuel pressure for use in the carburetor or mixing device C. Although the apparatus discloses a unitary construction combined in a manner to efficiently utilize all space requirements, particularly for conversion of a conventional internal combustion engine to the use of liquefied petroleum gas fuels, each of these elements will be discussed individually in sequence for a better understanding of the invention.

Figure 2:
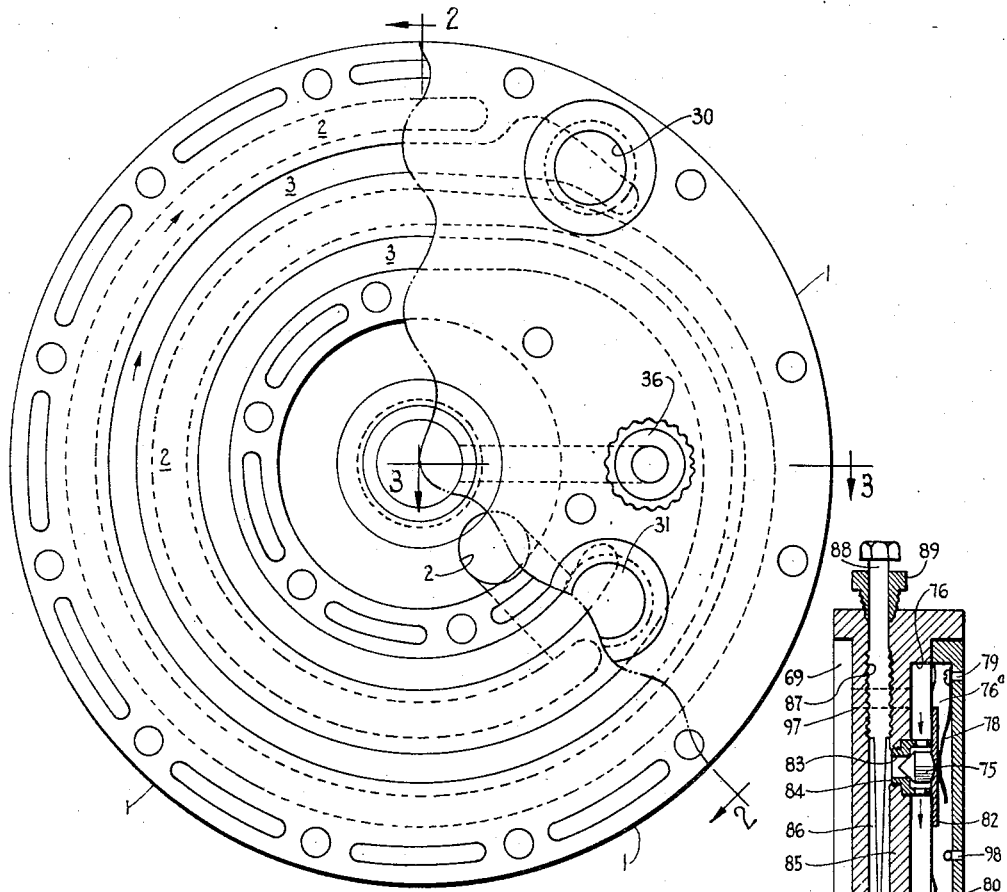
Figure 2 is an end elevational view of a high pressure regulator with a portion of the cover plate removed as shown along lines 2—2 for purposes of clarity.
Figure 3:
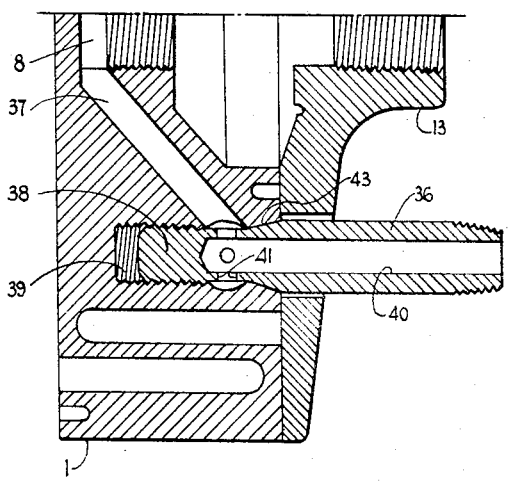
Figure 3 is a detail view in section taken on lines 3—3 of Fig. 2.

Referring to Figs. 1, 2 and 3, the high pressure regulator A comprises a manifold unit 1 of substantially circular configuration and which is provided with a plurality of spirally disposed passageways 2 and 3, respectively, for a purpose as will be hereinafter set forth. The central portion of the manifold 1 is provided with a central bore 4 (Fig. 1) having a portion of larger diameter 5 communicating with a smaller diametered portion 6. A boss member 7 extends into the bore 4 and is provided with a recess 8 for a purpose as will be hereinafter set forth. A cover plate 9 is secured by any suitable means (not shown) to the front face 10 of the manifold 1, and in similar manner, a rear cover plate 11 is secured by any suitable means (not shown) to the rear face 12 of the manifold 1. The cover plate 9 is provided with a central boss member 13 having a threaded aperture 14 for receiving an adjusting nut 15 for a purpose as will be hereinafter set forth. The recess 8 is threaded at 16 for receiving a threaded shank 17 of a manifold 18. The manifold is provided with a central bore 19 communicating with diametrically opposed passageways 20. An apertured valve stem holder 21 is disposed in the upper portion of the bore 19 and receives a valve stem 22 having a high pressure regulator valve 23 on one end thereof. A helical spring 24 is anchored between one face of the valve 23 and the bottom of the recess 8 for a purpose as will be hereinafter set forth. A diaphragm 25 is anchored between the front face 10 and the lid 9 in any suitable manner. The diaphragm carries a diaphragm button member 26 cooperating with a dampener unit 27 disposed in a recess 28 of the adjusting nut 15. A helical spring 29 is anchored against one face of the button 26 and the bottom of the recess 28 in the nut 15 for a purpose as will be hereinafter set forth.

Figure 7:
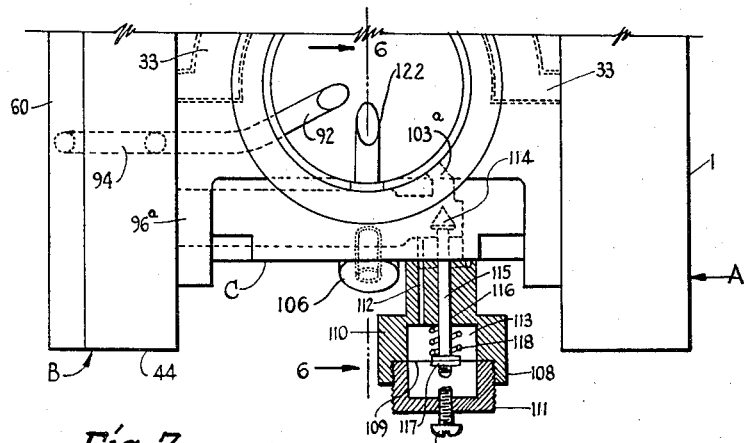
Figure 7 is a top plan view of the apparatus with certain parts broken away and certain parts of the mixing unit in section for purposes of clarity.
Figure 6:
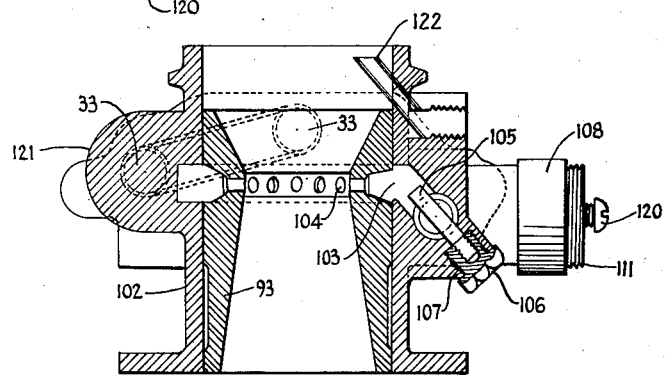
Figure 6 is a view taken on lines 6—6 of Fig. 7.
Figure 5:
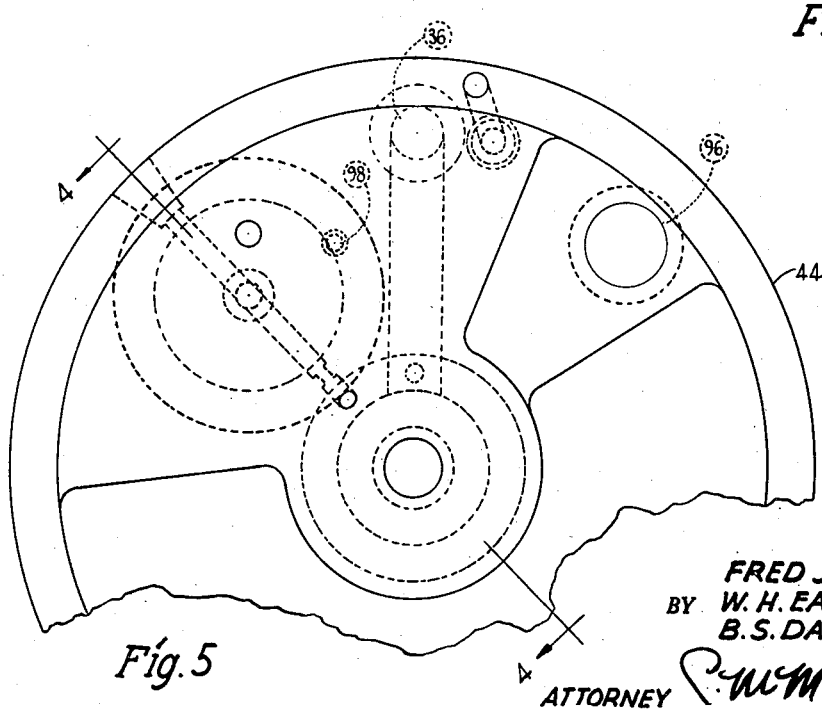
Figure 5 is an end elevational view of the low pressure regulator with certain portions broken away.

The lid 9 is provided with a plurality (at least two) of threaded apertures 30 and 31 communicating with the spiral passageways for a purpose as will be hereinafter set forth. The spiral passageway 2 normally carrying the engine fuel is disposed adjacent to the outer periphery of the manifold 1 and communicates with an aperture 32 provided in the rear cover plate 11 acting as a fuel outlet passage communicating with a fuel inlet conduit 33 in turn providing communication with a passageway 34 in the low pressure regulator B as will be hereinafter set forth. It will be noted that the conduit 33 is substantially arcuately shaped and disposed around the central boss 35 of the mixing valve C (Figs. 6 and 7).

*High pressure regulator operation*

In operation of the high pressure regulator, the fuel from a suitable storage tank (not shown) is discharged through suitable conduits (not shown) into an inlet nipple 36 (Fig. 3) communicating with a passageway 37 in turn communicating with the recess 8 of the manifold 1. The nipple 36 is provided with a threaded stud portion 38 threadedly engaged in a threaded recess 39 provided in the manifold 1, in conjunction with a tapered leak proof seat portion 43. Furthermore, the nipple is provided with a central bore 40 communicating with the passageway 37 through diametrically opposed ports 41. The fuel vapor pressure of the supply liquid forces the fuel through the nipple 36, passageway 37 into high pressure regulator valve chamber 8 in order that the high pressure regulator valve 23 may reduce the fuel from the higher supply tank pressure to an intermediate pressure that will be required by the low pressure regulator B. The valve 23 is constructed so that it will open against the supply tank pressure as a safety feature in the structure. It will be noted that the valve stem 22 is not connected to the diaphragm button 26 and therefore the differential pressure across the valve 23, plus the pressure exerted by the valve return spring 24 must close the valve when sufficient pressure has been reached. The high pressure fuel is discharged into the chamber 8 and with the valve in open position as shown is discharged into the bore 16 and ports 20, bore 6 and into the fuel spiral passageway 2 from which it flows spirally around the manifold 1 to be discharged from the outlet passageway 32 and into the inlet port 34 of the low pressure regulator B.

The spiral passageways 2 for the fuel are machined or cast spirally into the back side of the manifold 1 and are properly sealed in any suitable manner by the back cover plate 11. The spiral passageways 2 provide an elongated travel of the motor fuel, and upon reduction of the fuel pressure through the valve 23, the state of the fuel is usually that of a wet vapor at a reduced temperature. The elongated travel of the fuel in the passage 2 will provide sufficient wetted surface to allow complete vaporization of the fuel even at low operating temperatures. In similar manner, the spiral passageways 3 are machined or cast spirally into the front face of the manifold 1 and covered in seal proof relationship by the cover plate 9. The passageways 3 are interposed between the passageways 2 and are utilized for the passage of engine coolant (although not limited thereto) which may be introduced in either aperture 30 or 31 of the front cover plate 9 as desired. The passageways 3 are interposed between the fuel passageways 2 so as to offer a minimum resistance to heat flow to the fuel in passageways 2. The manifold 1 as constructed provides a large heat transfer surface which materially aids in preventing an accumulation of any large quantity of liquid fuel in the spiral passageways 2, which upon vaporization could cause a rise in the reduced intermediate pressure if there was a sudden stopping of the engine, as will be subsequently set forth. It will be apparent that the fuel and coolant spiral passageways 2 and 3 respectively, are arranged in the manifold so that either parallel or counter flow may be obtained by selective use of one of the inlet apertures 30 or 31 as desired. When the engine coolant and the fuel flow in the same direction through the manifold in what is commonly termed parallel flow, the hottest engine coolant would be in closest contact with the coldest fuel. However, a greater temperature differential could be obtained by directing the engine coolant and the fuel flow in an opposite direction, or counterflow through their respective passageways. It will thus be seen that the high pressure regulator, or vaporizer unit, may vary considerably in capacity by changing the direction of coolant flow through the manifold.

The inlet fuel discharging into the high pressure regulator chamber 8 and past the valve 23 at high velocity is prevented from impinging upon the diaphragm 25 by a deflector plate 42 carried by and disposed substantially adjacent one side of the manifold 18. To moderate any chattering characteristics that may be present in valve 23, the valve dampener 27 is utilized and operates upon the principle of an inertia dampener. It will be apparent that the value of the intermediate pressure desired of the motor fuel may be obtained by adjustment of the nut 15 cooperating with the helical spring 29.

*Low pressure regulator*

The motor fuel at a predetermined intermediate pressure discharges through an inlet port 34 of a low pressure manifold housing 44 provided with a central bore 45 of small diameter cooperating with a larger diametered bore 46 providing a low pressure chamber as will be hereinafter set forth. The housing 44 is provided with a central boss 47 and a baffled member 48 providing a plurality of passageways as will be hereinafter set forth. The inlet port 34 communicates with a passageway 49 in part provided by the partition 48. The central aperture or bore 45 receives a cover member 50 engageable therewith by any suitable means, such as threading or the like (not shown). A diaphragm 51 is anchored between the cover 50 and shouldered portions 52 of the boss 47. The cover 50 is provided with a recessed or cut away portion 53 providing a chamber for operation of the diaphragm 51 therein for a purpose as will be hereinafter set forth.

A low pressure regulator valve 54 is attached at one end by a bolt 55 secured to the diaphragm 51. A valve stem 56 extends outwardly from the valve through a valve guide 57 and is anchored by a bolt 58 to a diaphragm 59 in turn supported between a sectional cover portion 60 and the manifold 44. A pair of diaphragm buttons 61 and 62 are disposed on opposite sides of the diaphragm 59. A deflector plate 63 is carried in any suitable manner by the guide 57 and is disposed in spaced arrangement from the diaphragm buttons 62. The wall 48 is provided with a perpendicular extending circular shoulder portion 64 having a diametrically opposite portion 65 adjacent boss 47 providing a circular valve seat 66 and an outlet port or orifice 67 communicating with a passageway 68 in turn communicating with a chamber 69 provided between the larger bore 46 and the central boss 47 on one side of the diaphragm 59. A chamber 70 is provided by the cover 60 on the opposite side of the low pressure diaphragm 59 for a purpose as will be hereinafter set forth. The boss 47 is provided with an aperture or port 71 providing communication between the chamber 49 and the chamber 53. The valve 54 is provided with a vibration dampening ring 72 for a purpose as will be hereinafter set forth. A priming device 73 is mounted in any suitable manner on the low pressure cover plate 60 and has a rod 74 that may be either manually or electrically actuated for forcing the low pressure regulator valve 54 off its seat 66 when it is desired to provide additional fuel to the intake air stream under variable weather conditions.

Figure 4:
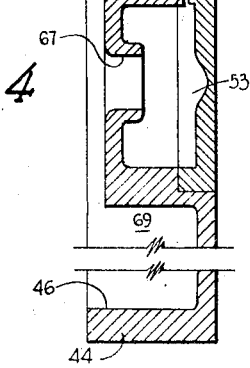
Figure 4 is a detail view in section taken on lines 4—4 of Fig. 5.

In Fig. 4 is depicted a lock off valve 75 preventing flow of fuel from the balancing chamber 53 when the engine is not running. The lock off valve structure is provided in a recessed portion 76 provided in manifold 44. A cover plate 77 is maintained by any suitable means, such as threading or the like (not shown) in the recessed portion 76, and has an arcuately shaped leaf spring 78 secured thereto by a threaded stud 79. A diaphragm 80 is anchored in any suitable manner between the plate 77 and shouldered portions 81 of the bore 76. The diaphragm carries a button or plate member 82 secured to the valve 75 disposed in an apertured valve seat 83 in turn threadedly secured in an aperture 84 of a wall 85 provided in the manifold 44. The wall 85 is disposed in spaced relation from partition 48 and provides a chamber 86 having a threaded portion 87 for receiving an idle screw 88 adjustable therein and maintained in adjusted position by a retaining lock nut 89. The idle screw 88 is tapered at its lower end and is adapted to seat in an aperture 90 provided by inwardly directed shoulders 91 of the partitions 85 and 48 and provides communication between the chamber 86 and passageway 86ª communicating with chamber 53 for a purpose as will be hereinafter set forth.

*Low pressure regulator operation*

The low pressure regulator unit B receives the incoming fuel through inlet port 34 at the predetermined intermediate pressure, and in such volume as shall subsequently be required by the fuel mixing valve C. Furthermore, the low pressure regulator B additionally functions to preclude, or stop the flow of fuel when the engine with which the apparatus is used is not running. The low pressure regulator is constructed and designed to provide fuel to the mixer C at a pressure which substantially approximates the impact pressure of the air discharging into the engine. The impact air pressure at the entrance of the impact passageway 92 (Figs. 1 and 7) in the mixer C is usually less than atmospheric air pressure by any amount of air pressure loss caused through restricted air flow by air cleaners or the like (not shown) usually present in carburetor systems. The low pressure regulator will supply metered vapor fuel at a pressure which is measured relative to the air at the entrance of the venturi 93 in the mixing valve C rather than atmospheric air pressure. It is well known that fluctuations in air flow caused by air cleaners and the like will cause variations in the metering of vapor fuel, consequently pressure reference for the low pressure regulator is not based upon atmospheric air pressure, but by providing a connection between the low pressure chamber 70 on one side of the low pressure diaphragm 59 and a passageway 94 (Fig. 1) connecting with the impact passage 92, any variations in air due to restrictions from air cleaners and the like will affect the fuel and air flow in the same manner, and consequently the air-fuel ratio will not be varied.

It has been observed that for all operating conditions of the internal combustion engine (not shown) above a fast idle speed, the vapor fuel pressure should be slightly less than that of the impact pressure. Consequently, for engine conditions below a fast idle, such as a slow idle and for starting the engine, the fuel pressure supplied to the mixture should be slightly greater than that of impact pressure and of a metered quantity.

The vapor fuel at a predetermined intermediate pressure from the high pressure regulator enters the inlet port 34 and discharges into the chamber 49 closed by the threaded plug 95. When the valve 54 is in open position the fuel discharges therethrough, where the pressure is reduced, and hence discharges through the outlet ports 67 and 68 into the metered fuel chamber 69. The size of the low pressure regulator orifice or port 66 determines the volume of flow through the low pressure regulator valve 54. The amount of opening or lift of the low pressure regulator valve and consequently the volume of flow through the orifice 66 is controlled by a balance of forces. These forces are produced by the differential in pressure across the low pressure regulator diaphragm 59, that is the pressure between the air impact pressure present in the chamber 70 on one side of the diaphragm 59, and the metered fuel pressure in chamber 69 on the opposite side; and the pressure drop across the valve 54 between the intermediate pressure of the fuel in the chamber 49 and the pressure of the metered fuel in the chamber 69 existing in the passageway 68 to the chamber 69. The latter pressure is partially balanced or controlled through a balancing force generated by the pilot diaphragm 51. The amount of balancing force generated by the diaphragm 51 depends upon the position of the regulating valve 54 in conjunction with the pressure differential across the orifice 71 and the selective idling orifice 90 both communicating with the balancing chamber 53 on one side of the diaphragm 51. When the valve 54 is in a substantially closed position the pilot diaphragm is in an approximate neutral position (not shown), and as the valve is moved to an open position there is a simultaneous movement of the diaphragm 51 to change the effective area of the pilot diaphragm 51 in that it is decreased. It will thus be seen that as the engine load increases, the balancing force generated by diaphragm 51 is decreased because of the decrease of the effective area, however, under starting or idle conditions, the effective area is greater and the balancing force is increased. The force of the pilot diaphragm is dependent upon its effective area which is controlled by the position of the valve and the pressure differentials relative to chamber 53 providing a delicate balance of forces for actuation of the valve 54 by the diaphragm 59 in order to precisely control the position of the valve 54 and the metering of the fuel therethrough.

It will be apparent that the low pressure orifice 90 communicates with the balancing chamber 53 (Fig. 4) through passageway 86ª, and the amount of balancing force generated on the diaphragm 51 is regulated by the idle adjustment screw 88. Under low speed idle conditions, the amount of fuel which is permitted to discharge through the valve 54 is obtained by varying the size of the low pressure aperture or orifice 90. It will be seen that variance in the size of this orifice varies the balancing force on the valve stem 56 which will overbalance the closing force on the valve 54 when the valve is open slightly to permit fuel to discharge therethrough and into the chamber 69.

Frictional resistance to flow in the chamber 69 will generate a pressure therein which acts upon the low pressure diaphragm 59, and this pressure is usually slightly greater than that of the impact pressure in the chamber 70, and the differential in pressure across the diaphragm 59 will oppose the unbalancing action on the balancing diaphragm 51. When these opposing forces are equal, the amount of fuel metered through the valve 54 and orifice 67 will be the right amount of fuel for idle conditions of the engine and can be varied to suit engine requirements by adjustment of the idle screw 88. It will thus be seen that the idle fuel will be delivered from the chamber 69 for discharge into the passageway 96 communicating with the mixing valve C at a slightly greater pressure than that of impact air pressure. The fuel is thus supplied through the main fuel passage 96 directly to the mixing valve C at idle conditions of the engine without any specially designed fuel passages for that purpose because of the overbalancing of the force on the low pressure valve 54.

As engine speed is increased and more metered fuel at predetermined low pressure is required, the pressure of the metered fuel in the chamber 69 will decrease slightly causing a larger differential pressure across the diaphragm 59 so that the diaphragm acting upon the valve 54 will move it to a greater open position and permit fuel in larger amounts to flow through the valve and through the regulating orifice 67 into the chamber 69. Equilibrium in an increased open position of the valve 54 is obtained because of the effective area of the balancing diaphragm 51 in balancing chamber 53 is decreased by moving it into the new position. It will thus be seen that the low pressure diaphragm 59 provides the main actuating force for opening the valve 54 and that the balancing or pilot diaphragm 51 provides the force necessary to partially balance out the closing force on the valve. The movement of the valve from a closed position to a full open position is very slight, consequently movement of the diaphragm 59 and its accompanying buttons 61 and 62 is only a very short distance which provides certain advantages. One advantage is that the valve can be quickly moved from a full closed position to a full open position thereby providing rapid acceleration characteristics for the engine. Furthermore, the short valve travel permits the use of large diaphragm buttons on the low pressure diaphragm 59 providing a larger effective area for obtaining greater sensitivity from a predetermined size of low pressure diaphragm.

In order that there will be a positive shut off of the vapor fuel when the engine is not operating, the balancing force of the balancing diaphragm 51 is precluded under such non-operating condition. The regulator valve 54 is of a type that opens against the incoming pressure of the vapor fuel in chamber 49, thereby providing for closing of the valve in case of diaphragm rupture thereby preventing leakage through the valve for safety purposes. In such construction there may be a positive shut off of the fuel when the engine is not operating, particularly if the balancing force of the diaphragm 51 is not present. Referring to Fig. 4, the balancing force or effect of the pilot diaphragm 51 is removed in non-operating condition by means of the lock off diaphragm 80 actuating the valve 75 to prevent discharge of fuel through passageway 97 communicating between chamber 69 and chamber 76. With engine manifold pressure not present in non-operating condition, the leaf spring 78 forces the valve 75 into a closed position against its seat 83, thereby preventing any flow of fluid from the chamber 53, consequently, the differential in pressure across the diaphragm 51 ceases to exist and there will be no balancing force by the pilot diaphragm 51 permitting the intermediate pressure in chamber 49 to force the low pressure regulator valve on its seat, thereby stopping flow of fuel.

As is depicted in Fig. 4, the engine manifold vacuum is permitted to act upon the lock off diaphragm 80 through the passageway 98 extending through the housing of the mixer C into communication with the chamber 76ª. It will thus be seen that the engine manifold vacuum will compress the spring 78, whereupon the valve 75 will be opened by the diaphragm 80 and communication is provided between the chamber 76 and the orifice 90 and the passageway 97. The tension of spring 78 may be predetermined or adjusted so that the manifold vacuum that would be generated by a cranking speed of the engine with the throttle closed is sufficient to depress the spring 78 and permit the valve 75 to open. The constant of the spring 78 may also be adjusted to permit metering of the fuel through the valve 54 during a starting operation of the engine.

The deflector plate 63 provided in the path of the valve orifice 67 prevents direct impingement of the high velocity fuel flow discharging through the valve 54 against the diaphragm button 62 and the low pressure diaphragm 59. The impact pressure from the intake air stream acts against the button 61 and the diaphragm 59 from chamber 70 through the passageway 94. It will thus be seen that the low pressure regulator through its valve 54 and plurality of diaphragms will provide fuel in a metered amount for starting the engine and fuel for idle at a pressure which is slightly greater than the impact pressure. Also fuel for load and speed operation of the engine above an idle condition may be slightly below that of impact pressure. The diaphragms 51 and 59 may be composed of any suitable flexible material, such as rubber or the like, but not limited thereto.

Mixing valve

The metered vapor fuel present in chamber 69 is discharged through the main fuel passageway 96 into a mixing valve or carburetor C used in conjunction with the regulators. The valve C comprises a cylindrical housing or air intake stack 100 provided with the usual pivotal throttle valve 101 disposed downstream of the air intake. The housing 100 is adjacent the low pressure regulator as shown in Figs. 1 and 7 and is adapted for connection in any suitable manner with an internal combustion engine (not shown). The stack 100 has a upper housing portion 102 (shown in elevation for purposes of clarity) secured in any suitable manner (not shown) to the stack 100. The upper portion 102 of the housing is provided with a passageway 96ª in alignment with passageway 96 for directing the metered fuel under variable pressure conditions into a main fuel jet or orifice 103.

The venturi section 93 is disposed in the stack portion 102 as shown in Fig. 6 for creating a pressure drop in the air stream sufficient to draw the fuel from the main jet therein. The venturi section 93 may be of the slip in type so that variable sizes may be used in accordance with the engine size, and characteristics of the carburetor unit with which it is used, however, it is to be understood that the venturi section is not limited to the slip in type. The venturi section is provided with drilled ports or passageways 104 (Fig. 6) circumferentially spaced around the throat of the venturi section, thus allowing the fuel to enter the air stream at a plurality of circumferentially spaced points and in different directions in order to provide for a good mixing of the fuel and air before the mixture reaches the distribution manifold of the engine, thereby assuring equal distribution to all the engine cylinders.

Although the main jet 103 is of a fixed size, the metering of fuel to the air stream in the stack 100 is by the restriction at the throat of the jet 103 which may be changed by inserting main fuel jet plugs 105 of variable sizes into the main fuel jet 103. The plugs 105 are inserted by a threaded plug 106 engaging a threaded recess 107 in the housing 102. After insertion of an appropriate and predetermined jet plug 105 for obtaining the proper air-fuel ratio, no further adjustment is necessary.

However, if the engine is to operate for a considerable portion of time at less than full capacity, a power valve assembly 108 may be necessary. The power valve is utilized to augment the fuel flow to the air stream along with the fuel flow to the main jet 103 under such conditions. The engine manifold vacuum operates on the power valve diaphragm 109 anchored between the valve housing 110 and a threaded adjusting member 111, and communication for the engine vacuum is provided through a passageway 112 (Fig. 1) exerting a vaccum in chamber 113 on one side of the diaphragm 109 (Fig. 7). The power valve 114 is of conical shape and includes a valve stem 115 disposed in an aperture 116 of the housing 110 with its opposite end of the stem anchored to the diaphragm 109 through a nut 117. A helical spring 118 is anchored between the bottom of the chamber 113 and the nut 117. Action of the manifold vacuum on the diaphragm 109 causes compression of the spring 118 where the valve 114 is moved to close off the orifice 103ª. As soon as the engine manifold vacuum is decreased to a predetermined value, the pressure in the chamber 113 is also decreased whereupon the spring 118 will move the valve 114 away from the orifice 103ª permitting extra fuel to flow into the venturi throat for mixture with the air stream. The maximum amount of fuel permitted to flow through the orifice 103ª under such conditions may be adjusted by limiting the position or lift of the valve 114 relative thereto through a power adjusting screw 120 carried in the member 111.

As will be noted in Figs. 6 and 7, the upper housing 102 of the air stack 100 is provided with an arcuately shaped flange portion 121 in which the passageway 33 is disposed providing communication for the fuel from the high pressure regulator A around the air stack into communication with the passageway 34 of the low pressure regulator B. The upper stack 102 is also provided with an auxiliary air conduit 122 which does not form any part of the present invention. It will be apparent that the present invention provides a unitary construction of the fuel feeding apparatus and such unitary arrangement is preferable, however, it is not limited thereto since the regulators A and B could be mounted in disassembled relation from the carburetor C and communicate therewith by suitable conduits (not shown).

Summary of operation

The operation of the above described apparatus should be apparent from the above description thereof, however in summarizing, the high pressure fuel from the supply tank (not shown) passes through the high pressure regulator A and across the pressure reduction valve 23 to reduce the high pressure to an intermediate pressure after which it is discharged from the spiral passageway 2 of the manifold 1 into the passageway 33, inlet port 34 and chamber 49 of the low pressure regulator B. In accordance with the operating conditions of the engine from a starting to a full load condition, differential in pressure across the main diaphragm 59 in conjunction with the pilot diaphragm 51 determine the lift or open position of the regulating valve 54 for metering the fuel from the input chamber 49 through the metering orifice 67 and into the fuel supply chamber 69 from where it is discharged into the main fuel passageway 96, and fuel jet 103 for discharge from the parts 104 of the venturi section 93 and hence into the engine. The metering of the fluid into the mixing valve under variable engine conditions is controlled by the balance of forces acting on the diaphragm 59 in conjunction with a balance of forces generated by the pilot diaphragm 51, except in conditions when the engine is not operating at which time the pressure in the balancing chamber 53 is precluded through the lock off valve 75 as heretofore set out. The discharge of the fluid through the jet 103ª may be also controlled through an auxiliary power valve 108.

From the foregoing, it will be apparent that the present invention provides a vapor fuel feeding apparatus for use with an internal combustion engine which may be initially installed with the engine, or by converting an engine using a gasoline carburetor system by direct placement of the present apparatus in lieu of the gasoline carburetor structure. Furthermore, the present invention contemplates a unitary structure with minimum space requirements to effect the conversion in the average internal combustion engine and where the high pressure liquefied petroleum gas is progressively reduced in pressure prior to discharge into the air stack for subsequent discharge into the manifold of the engine. The liquefied petroleum gas at the reduced pressure is metered into the engine and the presesure controlled for variable engine conditions from a starting condition of the engine through slow idle, fast idle and increased load conditions in order to meter the fuel in proper amounts at the required pressure for an efficient operation of the engine under all conditions. The control of the flow of fuel to the engine is through a balance of a plurality of forces all working in conjunction to meter the fluid for the most efficient operation complementary to engine load.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In a vapor fuel carburetor apparatus for internal combustion engines comprising in combination an engine intake stack having a fuel inlet, a pressure regulator adapted to receive vapor fuel at an intermediate intake pressure for discharging the fuel to the intake stack of the engine at a relatively low constant pressure, said pressure regulator comprising a control valve for reducing fuel pressure discharging to the intake stack, a main diaphragm connected to the valve having one side thereof communicating with the air impact pressure of the intake stack and the opposite sides communicating with the reduced fuel pressure, said main diaphragm responsive to a balance of forces provided by the pressure differential across the main diaphragm and the pressure differential across the valve for movement of the valve to alternate positions of open and close, a pilot diaphragm operatively connected to the control valve and adapted to generate a variable balancing force for partially balancing out the pressure differential across the reducing control valve, a balancing chamber on one side of the pilot diaphragm, means providing communication between the intake fuel pressure and the balancing chamber, means providing communication between the balancing chamber and the reduced fuel pressure under operating conditions of the engine, said last mentioned means cooperating with the first mentioned means to provide a balancing pressure in the balancing chamber cooperating with the pressures on one side of the main diaphragm for effecting movement of the valve in one direction.

2. In a vapor fuel carburetor apparatus for internal combustion engines comprising in combination an engine intake stack having a fuel inlet, a pressure regulator adapted to receive vapor fuel at an intermediate intake pressure for discharging the fuel to the intake stack of the engine at a relatively low constant pressure, said pressure regulator comprising a control valve for reducing fuel pressure discharging to the intake stack, a main diaphragm connected to the valve having one side thereof communicating with the air impact pressure of the intake stack and the opposite side communicating with the reduced fuel pressure, said main diaphragm responsive to a balance of forces provided by the pressure differential across the main diaphragm and the pressure differential across the control valve for movement of the valve to alternate positions of open and close, a pilot diaphragm operatively connected to the control valve and adapted to generate a variable balancing force for partially balancing out the pressure differential across the control valve, a balancing chamber on one side of the pilot diaphragm, means providing communication between the intake fuel pressure and the balancing chamber, means providing communication between the balancing chamber and the reduced fuel pressure under operating conditions of the engine, said last mentioned means cooperating with the first mentioned means to provide a balancing pressure in the balancing chamber cooperating with the pressures on one side of the main diaphragm for effecting movement of the valve in one direction, said pilot diaphragm responsive to movement of the valve to vary the effective area of the pilot diaphragm to provide the variable balancing force for partially balancing out the pressure differential across the reduction valve.

3. In a vapor fuel carburetor apparatus for internal combustion engines comprising in combination an engine intake stack having a fuel inlet, a pressure regulator adapted to receive vapor fuel at an intermediate intake pressure for discharging the fuel to the intake stack of the engine at a relatively low constant pressure, said pressure regulator comprising a control valve for reducing fuel pressure discharging to the intake stack, a main diaphragm connected to the valve having one side thereof communicating with the air impact pressure of the intake stack and the opposite side communicating with the reduced fuel pressure, said main diaphragm responsive to a balance of forces provided by the pressure differential across the main diaphragm and the pressure differential across the valve for movement of the valve to alternate positions of open and close, a pilot diaphragm operatively connected to the valve and adapted to generate a variable balancing force for partially balancing out the pressure differential across the reducing valve, a balancing chamber on one side of the pilot diaphragm, an orifice providing communication between the intake fuel pressure and the balancing chamber, a passageway providing communication between the balancing chamber and the reduced fuel pressure, said passageway cooperating with said orifice to provide a balancing pressure in the balancing chamber cooperating with the pressures on one side of the main diaphragm for effecting movement of the valve in one direction, an idling port provided in the passageway, an adjustable idling screw cooperating with the port to vary the bleed through the port under idle conditions of the engine, a lock off valve disposed in the passageway, said lock off valve comprising a diaphragm connected to the lock off valve and having one side exposed to engine manifold pressure, spring means cooperating with engine manifold pressure for actuating the last mentioned diaphragm, said lock off valve responsive to engine manifold pressure to preclude seating of the valve, thereby providing for a flow of the reduced fuel pressure to the balancing chamber.

4. In a vapor fuel carburetor apparatus for internal combustion engines comprising in combination an engine intake stack having a fuel inlet, a pressure regulator adapted to receive vapor fuel at an intermediate intake pressure for discharging the fuel to the intake stack of the engine at a relatively low constant pressure, said pressure regulator comprising a control valve for reducing fuel pressure discharging to the intake stack, a main diaphragm connected to the valve having one side thereof communicating with the air impact pressure of the intake stack and the opposite side communicating with the reduced fuel pressure, said main diaphragm responsive to a balance of forces provided by the pressure differential across the main diaphragm and the pressure differential across the valve for movement of the valve to alternate positions of open and close, a pilot diaphragm operatively connected to the valve and adapted to generate a variable balancing force for partially balancing out the pressure differential across the reducing valve, a balancing chamber on one side of the pilot diaphragm, an orifice providing communication between the intake fuel pressure and the balancing chamber, a passageway providing communication between the balancing chamber and the reduced fuel pressure, said passageway cooperating with the orifice to provide a balancing pressure in the balancing chamber cooperating with the pressures on one side of the main diaphragm for effecting movement of the valve in one direction, an idling port provided in the passageway, an adjustable idling screw cooperating with the port to vary the bleed through the port under idle conditions of the engine, a lock off valve disposed in the passageway, said lock off valve comprising a diaphragm connected to the lock off valve and having one side exposed to engine manifold pressure, spring means cooperating with the engine manifold pressure for actuating the last mentioned diaphragm, said lock off valve responsive to engine manifold pressure to preclude seating of the valve, thereby providing flow of the reduced fuel pressure to the balancing chamber, said diaphragm responsive to absence of manifold pressure against the actuating spring member when the engine is stopped whereby the valve is closed to preclude flow of the reduced fuel pressure to the balancing chamber.

References Cited in the file of this patent

UNITED STATES PATENTS

| | | |
|---|---|---|
| Re. 22,447 | Hersey | Feb. 29, 1944 |
| 2,073,298 | Ensign | Mar. 9, 1937 |
| 2,073,299 | Ensign | Mar. 9, 1937 |
| 2,240,846 | Hanson | May 6, 1941 |
| 2,279,530 | Smith | Apr. 14, 1942 |
| 2,448,131 | Williams | Aug. 31, 1948 |
| 2,487,089 | Anthes | Nov. 8, 1949 |
| 2,587,165 | Jones | Feb. 26, 1952 |